B. J. BIGELOW.
MILKING MACHINE.
APPLICATION FILED APR. 7, 1909.

948,841.

Patented Feb. 8, 1910.

2 SHEETS—SHEET 1.

WITNESSES
F. C. Barry
L. A. Stanley

INVENTOR
Bert J. Bigelow
BY Munn & Co.
ATTORNEYS

B. J. BIGELOW.
MILKING MACHINE.
APPLICATION FILED APR. 7, 1909.
948,841.
Patented Feb. 8, 1910.
2 SHEETS—SHEET 2.
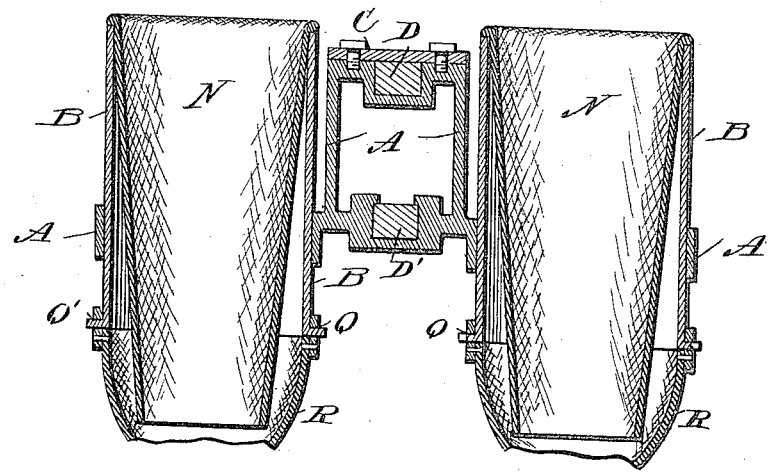
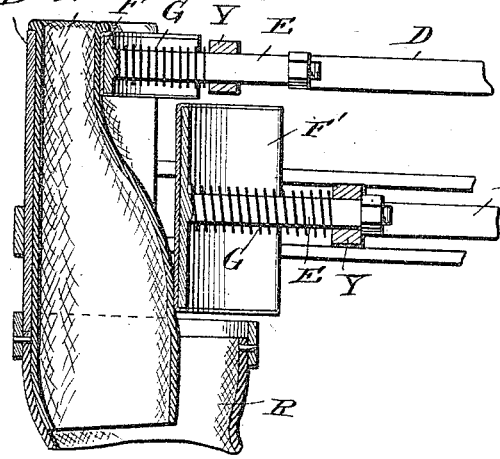
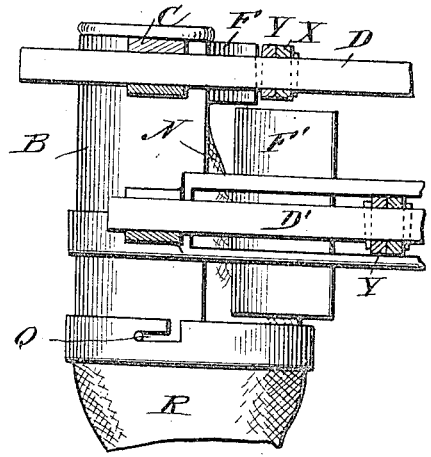
WITNESSES
F. C. Barry
L. S. Stanley
INVENTOR
BERT J. BIGELOW
BY Munn & Co.
ATTORNEYS

UNITED STATES PATENT OFFICE.

BERT JAMES BIGELOW, OF LA CROSSE, WISCONSIN.

MILKING-MACHINE.

948,841.  Specification of Letters Patent.  Patented Feb. 8, 1910.

Application filed April 7, 1909. Serial No. 488,369.

*To all whom it may concern:*

Be it known that I, BERT JAMES BIGELOW, a citizen of the United States, and a resident of La Crosse, in the county of La Crosse and State of Wisconsin, have invented a new and useful Improvement in Milking-Machines, of which the following is a specification.

My invention relates to devices for milking animals by mechanical means, and it consists in the construction, combination and arrangement hereinafter described and claimed.

An object of my invention is to provide a machine which is capable of milking cows or other animals quickly and with comparatively little effort.

A further object of my invention is to provide a milking device which will effect the milking operation in a sanitary manner, thereby preventing the spread of disease which is likely to result from the unsanitary methods of the ordinary process.

Other objects and advantages will appear in the following specification and the novel features of the device will be particularly pointed out in the appended claims.

My invention is illustrated in the accompanying drawings, in which—

Figure 1:
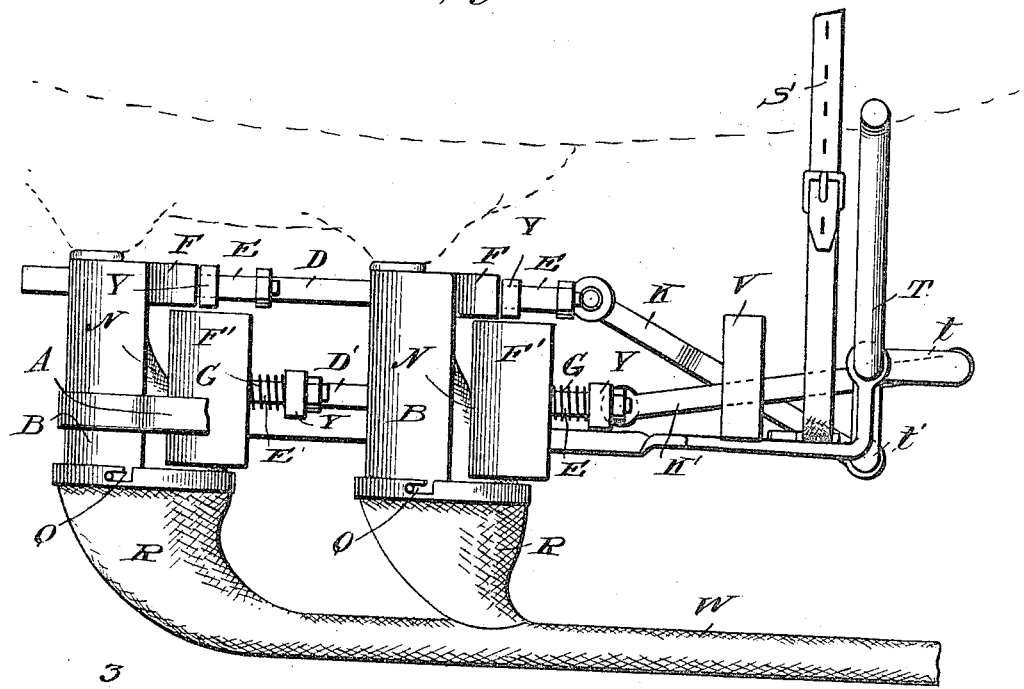
Figure 2:
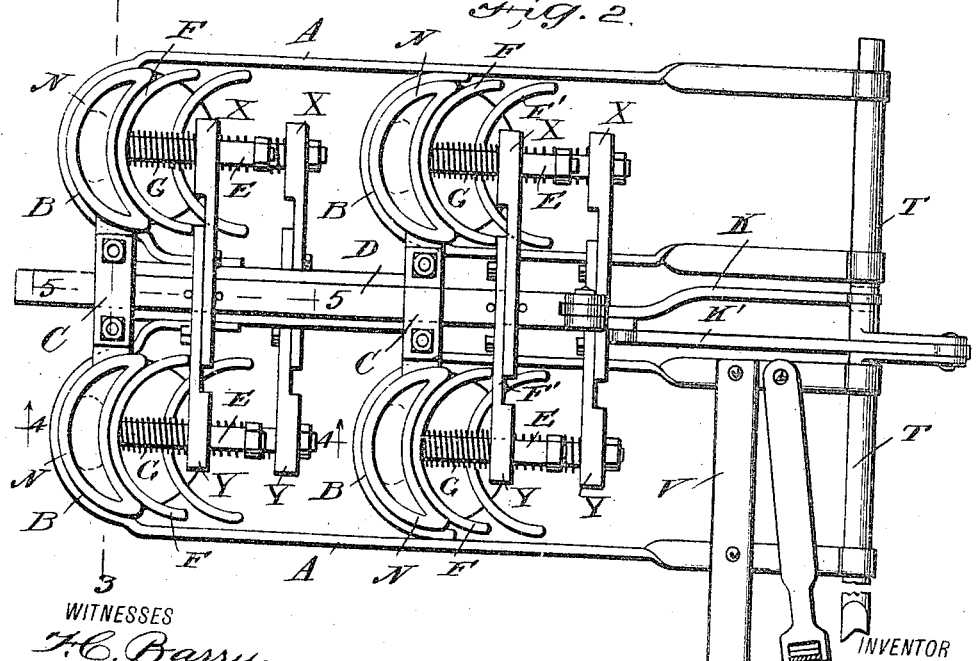

Figure 1 is a side view of my improved machine showing it in operative position. Fig. 2 is a plan view of the machine. Fig. 3 is an enlarged section along the line 3—3 of Fig. 2. Fig. 4 is an enlarged section along the line 4—4 of Fig. 2, and Fig. 5 is an enlarged section along the line 5—5 of Fig. 2.

In carrying out my invention I provide a light metal frame comprising the longitudinal strips A, the semi-cylindrical members B and the cross members C (see Figs. 2 and 3). Slidably secured to the cross members C are the upper and lower reciprocating rods D and D' respectively. Each of these rods carries a pair of oppositely projecting adjusting arms X and Y whose ends are perforated to admit the plungers E and E' which bear the semi-cylindrical heads F and F'. Spiral springs G keep these heads in a normally extended position. As will be seen from Fig. 1 the upper heads F are small in comparison with the lower heads F'. Each of the rods D and D' is connected by means of a pitman K and K' to the crank portions $t$ and $t'$ of the shaft T in such a manner that when one rod is moved forward the other is moved backward. The crank portions $t$ and $t'$ are not opposite each other but are at approximately 90° apart so that there is a period when both rods may be moving in the same direction. L is the lever or handle for operating the device.

From the foregoing description of the main operating parts the operation of the device may be readily understood. The device is suspended from the back of the animal by means of the strap S or other suitable support. Suspended from each semicylinder B is a rubber nipple N into which the teat of the animal is placed. Secured to the bottoms of the members B by means of the bayonet joints Q are the rubber receptacles R having a common outlet tube W.

The apparatus being thus arranged the operator grasps the bar V with the left hand to steady the mechanism. He then works the lever L back and forth thereby causing the reciprocation of the rods D and D'. The movement of the heads F causes the compression of the upper part of the rubber nipple N and the udder of the animal. Before the member F has been withdrawn the lower member F' now compresses the lower part of the rubber nipple and the teat itself thereby forcing the milk out into the receptacle R from whence it runs through the tube W to the collecting vessel. This operation is repeated until the milk is all withdrawn.

I claim—

1. In a milking machine, a frame having semicylindrical backing members at one end thereof, cross members carried by said frame, upper and lower rods slidably secured to said cross members, perforated adjustable arms carried by said rods, spring controlled plungers disposed in the perforations in said arms having semicylindrical heads, the heads on the upper arms being larger than those on the lower, a resilient nipple suspended from each semicylindrical backing, and means for reciprocating the rods so as to cause the upper heads to compress the upper part of the nipple and the subsequent compression of the lower part of the nipple at the lower heads before the retraction of the upper heads.

2. In a milking machine, a frame provided with backing members, cross members carried by the said frame, rods slidably secured to said cross members, perforated arms carried by said rods, plungers disposed in the perforations in said arms and provided with heads, a resilient nipple suspended from each backing member, and means for causing the retraction of the rods so as to compress the nipple.

3. In a milking machine, a frame, backing members carried thereby, rods slidably secured thereto, and provided with perforated arms, plungers disposed in the perforations in said arms and provided with heads, a resilient nipple suspended from each backing member, and means for reciprocating the rods, said means comprising a crank shaft and connecting rod, certain of said rods being connected up to cause the heads to compress the upper part of the nipple and other rods being connected up to cause the subsequent compression of the lower part of the nipple for the retraction of the upper rod.

BERT JAMES BIGELOW.

Witnesses:
JAMES H. McHUGH,
JOSEPH COOPER.